United States Patent
Mildner et al.

(10) Patent No.: US 10,023,245 B2
(45) Date of Patent: Jul. 17, 2018

(54) MOTOR VEHICLE BODY

(71) Applicant: GM GLOBAL TECHNOLOGY OPERATIONS LLC, Detroit, MI (US)

(72) Inventors: Udo Mildner, Ruesselsheim (DE); Lothar Teske, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/449,867

(22) Filed: Mar. 3, 2017

(65) Prior Publication Data

US 2017/0253278 A1    Sep. 7, 2017

(30) Foreign Application Priority Data

Mar. 3, 2016   (DE) .................. 10 2016 002 574

(51) Int. Cl.

| | |
|---|---|
| *B62D 25/02* | (2006.01) |
| *B62D 25/04* | (2006.01) |
| *B62D 25/06* | (2006.01) |
| *B62D 25/08* | (2006.01) |
| *B62D 27/02* | (2006.01) |
| *B62D 25/16* | (2006.01) |

(52) U.S. Cl.
CPC .......... *B62D 27/023* (2013.01); *B62D 25/025* (2013.01); *B62D 25/04* (2013.01); *B62D 25/06* (2013.01); *B62D 25/16* (2013.01)

(58) Field of Classification Search
CPC ........ B62D 25/02; B62D 25/04; B62D 25/08; B62D 25/087; B62D 25/088; B62D 25/16; B62D 27/023; B60Y 2304/074; B60Y 2410/124

USPC ..... 296/198, 203.03, 193.05, 193.06, 187.12
See application file for complete search history.

(56) References Cited

U.S. PATENT DOCUMENTS

| | | |
|---|---|---|
| 5,123,696 A | 6/1992 | Watari |
| 2007/0138837 A1 | 6/2007 | Tomioka |
| 2014/0158567 A1* | 6/2014 | Park ................. B62D 25/02 206/335 |
| 2014/0284968 A1* | 9/2014 | Park ................. B62D 25/08 296/193.08 |
| 2015/0108790 A1* | 4/2015 | Mildner ............ B62D 25/02 296/191 |

(Continued)

FOREIGN PATENT DOCUMENTS

| | | |
|---|---|---|
| DE | 19724427 A1 | 12/1998 |
| DE | 19946013 A1 | 3/2001 |

(Continued)

OTHER PUBLICATIONS

Great Britain Patent Office, Great Britain Search Report for Great Britain Application No. GB1703128.7, dated Jul. 6, 2017.

(Continued)

*Primary Examiner* — Gregory A Blankenship
(74) *Attorney, Agent, or Firm* — Lorenz & Kopf, LLP

(57) ABSTRACT

A motor vehicle body includes a rear wheel housing with a wheel well that accommodates a rear wheel and a wall section upwardly projecting form the wheel well. A C-pillar inner wall is fastened to the wall section along a first fastening zone and overlaps an opening formed in the wall section between the first fastening zone and wheel well. A weld joins the C-pillar inner wall and a C-pillar outer wall together at the level of the opening.

10 Claims, 4 Drawing Sheets

(56) References Cited

U.S. PATENT DOCUMENTS

| | | | | |
|---|---|---|---|---|
| 2015/0183467 A1* | 7/2015 | Ebihara | ............... | B62D 25/08 |
| | | | | 296/187.11 |
| 2015/0217809 A1* | 8/2015 | Kisaku | ............... | B62D 25/02 |
| | | | | 296/193.05 |
| 2015/0251703 A1* | 9/2015 | Yamada | ............ | B62D 25/087 |
| | | | | 296/187.12 |
| 2016/0023685 A1* | 1/2016 | Fujii | ............... | B62D 25/087 |
| | | | | 280/124.154 |
| 2017/0137065 A1* | 5/2017 | Lange | ............... | B62D 25/025 |
| 2017/0197665 A1* | 7/2017 | Kabayama | ......... | B62D 25/088 |
| 2017/0253278 A1* | 9/2017 | Mildner | ............ | B62D 25/025 |
| 2017/0305472 A1* | 10/2017 | Lee, III | ............ | B62D 25/088 |
| 2017/0355316 A1* | 12/2017 | Ranga | ............... | B60R 5/044 |

FOREIGN PATENT DOCUMENTS

| | | |
|---|---|---|
| DE | 102008024702 A1 | 11/2009 |
| DE | 102012009970 A1 | 11/2012 |
| KR | 20040048684 A | 6/2004 |

OTHER PUBLICATIONS

German Patent Office, German Search Report for German Patent Application No. 10 2016 002 574.3 dated Dec. 7, 2016.

\* cited by examiner

US 10,023,245 B2

MOTOR VEHICLE BODY

CROSS-REFERENCE TO RELATED APPLICATION

This application claims priority to German Patent Application No. 102016002574.3, filed Mar. 3, 2016, which is incorporated herein by reference in its entirety.

TECHNICAL FIELD

The present disclosure pertains to a motor vehicle body with a multi-walled C-pillar, i.e., one having at least one outer and one inner wall.

BACKGROUND

DE 197 24 427 A1 shows a motor vehicle body in which one lateral wall includes is composed of an inner and an outer lateral wall unit. The inner lateral wall unit encompasses a C-pillar inner wall, and the outer lateral wall unit encompasses a C-pillar outer wall. In this conventional motor vehicle body, the inner lateral wall unit must initially be fastened to a central part of the body. Thereafter, the edges of the outer lateral wall unit must be fastened to the inner one, since given a reversed assembly sequence, the outer wall unit covers those portions of the inner lateral wall unit at which the latter must be welded with the central part, thereby preventing a welding tool from accessing these areas.

If the motor vehicle body is exposed to a deformation load from a lateral direction during an accident, in particular at the level of the beltline, strong forces arise at the boundary between the relatively stiff lower part of the passenger compartment and the upper part that is stabilized only by the pillars bearing the roof and can be deformed much more easily, which can cause the lateral wall to buckle and cave in. While the lateral wall can be stiffened by using material with an enlarged wall thickness, this is undesirably associated with increased material costs and, given the increased vehicle mass, a rise in fuel consumption.

SUMMARY

The present disclosure is provides a motor vehicle body that achieves a high dimensional stability for the passenger compartment at a low weight. In one embodiment, the present disclosure provides a motor vehicle body with a rear wheel housing, which encompasses a wheel well accommodating a rear wheel and a wall section upwardly projecting from the wheel well. A C-pillar inner wall is fastened to the wall section along a first fastening zone and overlaps an opening formed in the wall section between the first fastening zone and wheel well. A weld joins the C-pillar inner wall and a C-pillar outer wall together at the level of the opening. An area of the C-pillar inner wall that in the absence of the opening would otherwise be enclosed between the wall section of the wheel housing and C-pillar outer wall can be reached by a welding tool via the opening.

An area of the C-pillar inner wall that overlaps the rear wheel housing is not conceivable for the body known from DE 197 24 427 A1, since the C-pillar inner wall and rear wheel housing are there constituents of the same one-part inner lateral wall unit. By welding this overlapping area to the C-pillar outer wall through the opening of the wall section, a connection can be established between the inner and outer wall at a location that is completely inaccessible in a conventional body structure. The increased stiffness of the body provided by this connection in particular at the beltline level makes it possible to save on material at other locations of the lateral wall, and thereby reduce costs and weight.

The weld should be located at a lower edge of the C-pillar inner wall. Since welding on the C-pillar outer wall generally leaves traces behind, the C-pillar outer wall should be covered by a rear mudguard at the level of the weld.

The wall section can exhibit several openings, which are distributed along the lower edge of the of the C-pillar inner wall so as to ensure access to welds distributed there.

A second fastening zone that is provided at the rear wheel housing between the opening and wheel well and has secured to it the C-pillar outer wall can contribute greatly to the stiffness of the body as well.

The C-pillar inner walls of a left and a right lateral body wall should be joined together by transverse structural elements of a central body portion. At least one such structural element should extend under a rear window opening. One such transverse structural element can be shaped in particular like a parcel shelf.

A welding zone in which the transverse structural element is joined with the C-pillar inner wall can extend between a lateral window opening and the rear window opening. Such a welding zone is accessible for welding, provided the C-pillar inner wall and C-pillar outer wall have not yet been joined together.

It is best for body stiffness that the transverse structural element be vertically offset relative to the first fastening zone.

The transverse structural element can be joined with the rear wheel housing by a support arranged inwardly from the C-pillar inner wall of the body. In this way, the transverse structural element is already fixed to the body before attaching the C-pillar inner wall, making it easier to attach the C-pillar inner wall.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
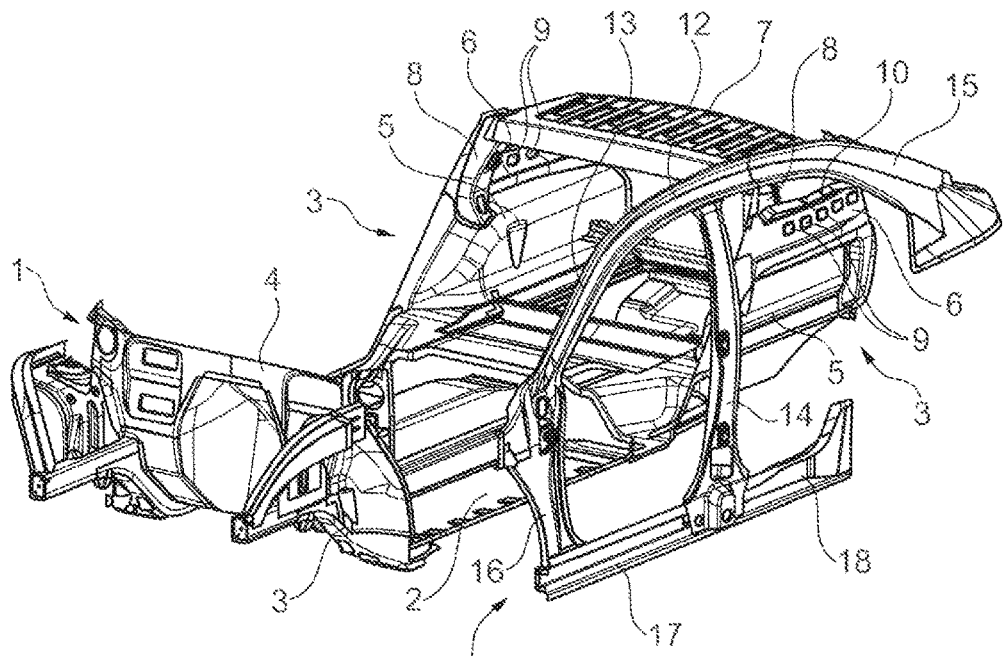
FIG. 1 is a vehicle body according to the present disclosure in a first assembly stage.

FIG. 1 shows a motor vehicle body according to the present disclosure in a first stage of its assembly. The base plates 2, front and rear wheel housings 3 and an end wall 4 are joined together in a central part 1 of the body. The rear wheel housings 3 each encompass a laterally outwardly open wheel well 5 and a wall area 6 that projects upwardly over the wheel well 5. A parcel shelf 7 is connected with the two rear wheel housings 3 by two supports 8, which are welded onto an upper side of the wheel well 5 and an interior side of the wall area 6. Behind the support 8, a row of openings 9 extends essentially horizontally along the wall area 6. A welding flange 10 is angled at an inclination into the vehicle interior along the upper edge of the wall area 6.

Figure 2:
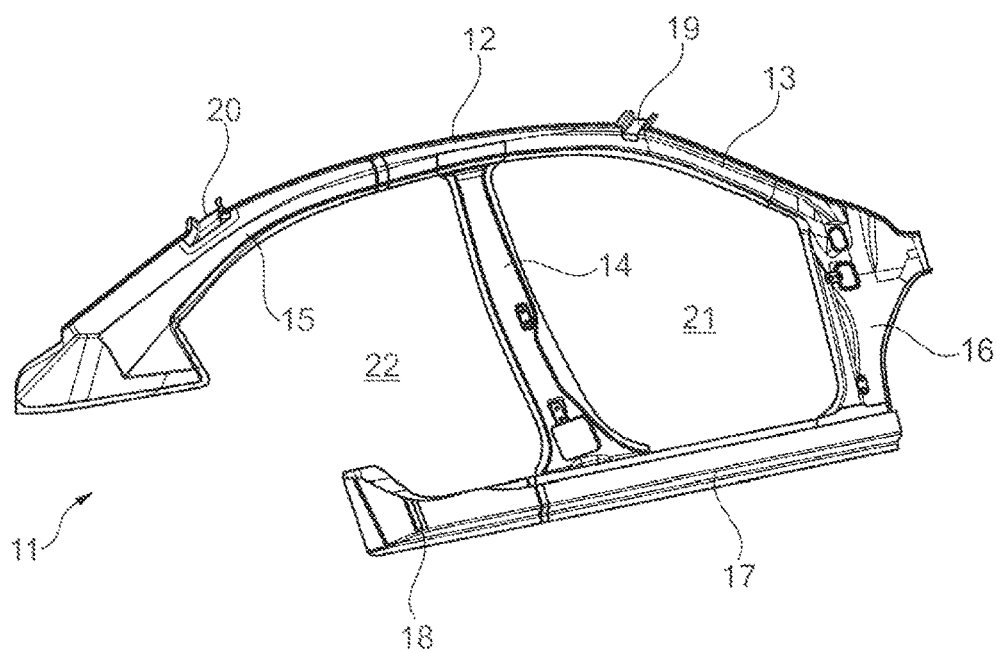
FIG. 2 is an assembly from FIG. 1 in an individual view.

A module 11 shown spaced apart from the central part 1 is provided for assembly along the lateral edges of the central part 1. It is shown in an individual view on FIG. 2, and encompasses a lateral roof frame 12, inner walls 13, 14, 15 of A-, B- and C-pillars fastened thereto, a lateral end wall 16 for welding along a lateral edge of the end wall 4, as well as inner walls 17, 18 of a door sill for welding on edges of the base plates 2. An extension piece 19 for a front roof frame is located at the front end of the lateral roof frame 12, and an extension piece 20 for a rear roof frame is located on the C-pillar inner wall 15. The lateral end wall 16, the A-pillar inner wall 13, the lateral roof frames 12, the B-pillar inner wall 14 and the front door sill inner wall 17 include a complete frame around a front door opening 21. A frame around a rear door opening 22 still has gaps; it is only closed during assembly of the module 11 on the central part 1 by welding the rear sill inner wall 18 and the C-pillar inner wall 15 onto the rear wheel housing 3.

Figure 3:
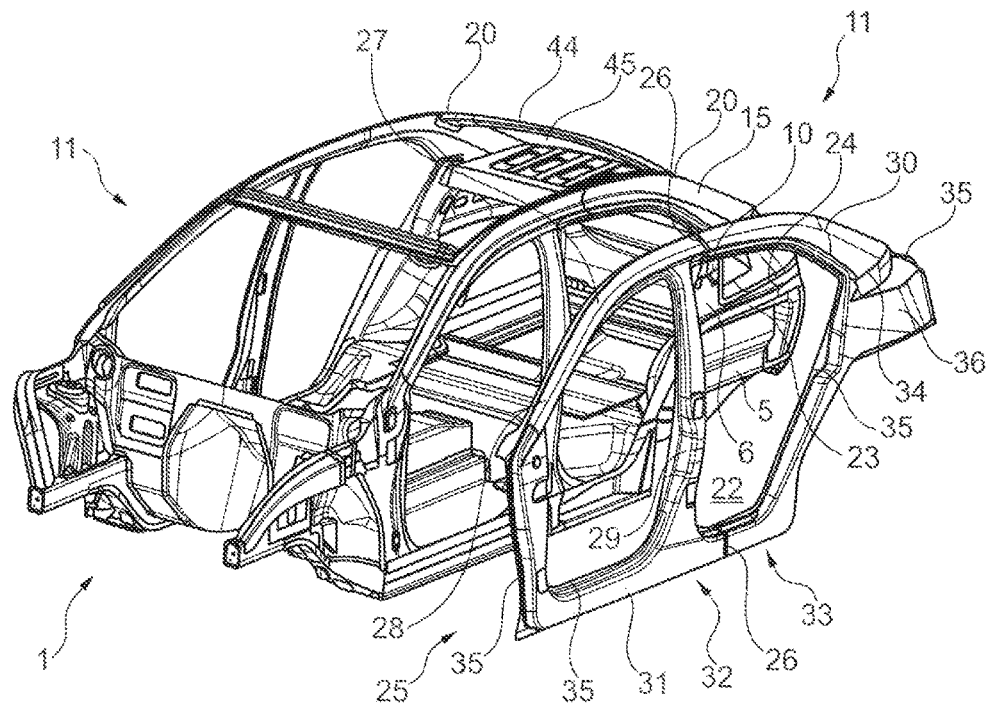
FIG. 3 is the vehicle body in a second assembly stage.

FIG. 3 shows an assembly stage of the body in which the module 11 is welded onto the central part. The C-pillar inner wall 15 is welded with the wall area 6 of the rear wheel housing 2 along the welding flange 10. A part of the C-pillar inner wall 15 that protrudes downwardly over the welding flange 10 is laterally outwardly offset relative to the wall area 6. Extending at its lower edge is a welding flange 24, which lies vertically between the welding flange 10 and a welding zone 23 including the boundary between the wall area 6 and wheel well 5, and overlaps the openings 9 of the wall area 6.

An inner part 44 of a rear roof frame extending between the extension pieces 20 and the parcel shelf 7 marks the boundaries of a rear window opening 45.

A component 25 to be attached next is again shown spaced apart laterally from the body. Either cohesively in single parts or as several individual parts welded to each other at joints 26, the component 25 encompasses outer walls 27, 28, 29, 30, 31 of the lateral roof frame, the A-, B- and C-pillar and the door sill. The figure shows joints 26 between two components 32, 33, of which the front one encompasses the outer walls 27, 28, 29 of the lateral roof frame, the A-pillar and the B-pillar, and the rear one encompasses the C-pillar outer wall 30, while the sill outer wall 31 is distributed between the two components 32, 33. Other positions for the joints 26 between the components 32, 33 or a higher number of components and joints are possible.

An essentially horizontally extending, protruding shoulder 34 is formed on the C-pillar outer wall 30, here proceeding from a rear corner of the door opening 22.

Figure 4:
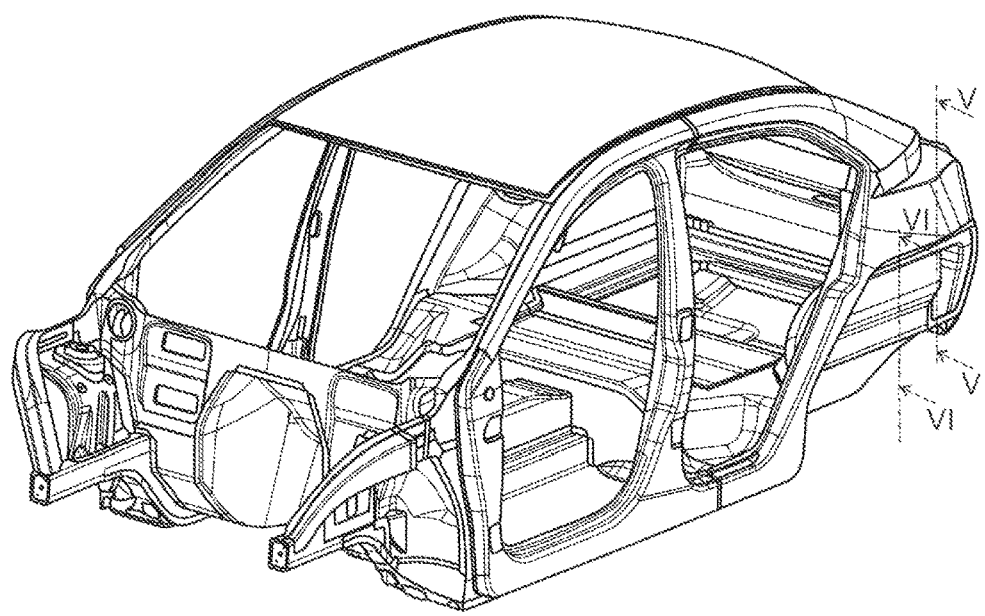
FIG. 4 is the vehicle body in a third assembly stage.

In the illustration on FIG. 4, the component 25 is welded onto the module 11 or onto the welding zone 23 of the rear wheel housing 3 on flanges 35, which extend along the door openings 21, 22 and on an outer edge of the component 25. A section 36 of the C-pillar outer wall 30 extending between the welding zone 23 and the shoulder 34 covers the welding flange 24 at the lower edge of the C-pillar inner wall 15.

Figure 5:
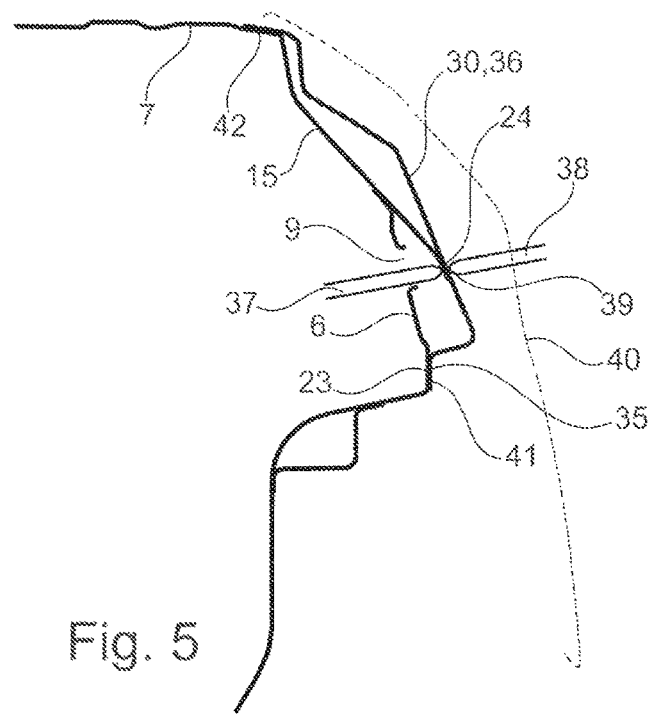
FIG. 5 is a cross section through the body shown in FIG. 4.

Viewed in a vertical direction and a transverse direction of the vehicle, FIG. 5 shows a section through a lateral wall area of the vehicle body along the line marked V-V on FIG. 4. The section plane runs through one of the openings 9 of the wall area 6. At the level of the opening 9, the welding flange 24 of the C-pillar inner wall 15 abuts against the C-pillar outer wall 30. In order to fasten the inner and outer wall to each other along the welding flange 24, a welding electrode 37 can be pressed from the vehicle interior through the opening 9 against the welding flange 24, while a counter-electrode 38 is placed oppositely on the exterior side of the section 36. In order to conceal traces left behind by the counter-electrode 38 on the weld 39 in the welding process, the section 36 is covered by a rear mudguard 40 in the finished vehicle. The hollow body of the C-pillar, which is fabricated in a known manner by welding together the inner and outer wall 15, 30 along the flange 35 on their edges extending along the flange 35, is thereby additionally stiffened by an internal strutting arrangement, which is formed by fastening the part of the inner wall 15 that downwardly extends beyond the welding flange 10 of the rear wheel housing 3 to the outer wall 30 by means of the flange 24.

The mudguard 40 covers the welds 41 between the welding zone 23 of the rear wheel housing 3 and the flange 35 at the lower edge of the C-pillar outer part 30 or 42 between the parcel shelf 7 and upper edges of the C-pillar inner wall 15 and the C-pillar outer wall 30.

Figure 6:
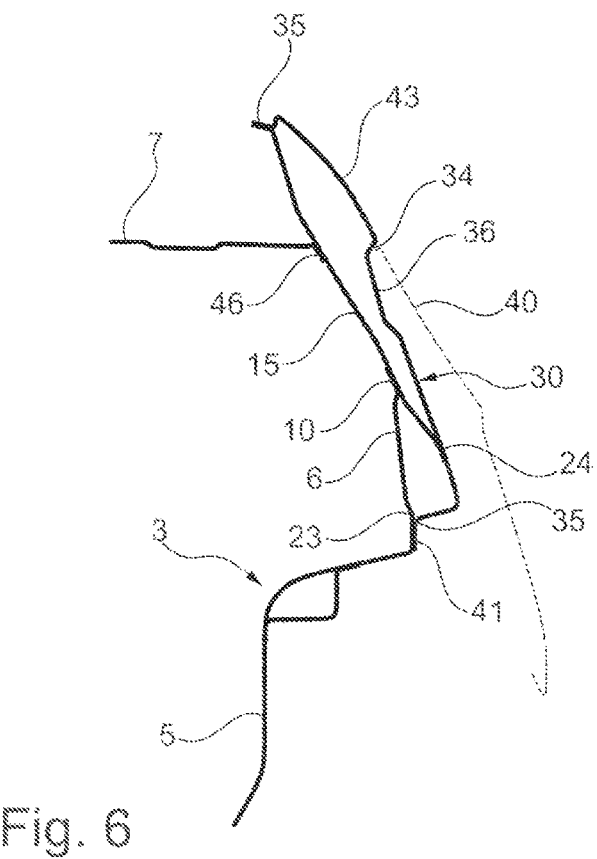
FIG. 6 is another section through the body shown in FIG. 4.

FIG. 6 shows a second section along a plane that is displaced parallel forward relative to the plane on FIG. 5, and marked VI-VI on FIG. 4. The section plane runs between two openings 9, so that no weld is depicted between the welding flange 24 of the C-pillar inner wall 15 and the C-pillar outer wall 30; even so, the welding flange is kept in contact with the C-pillar outer wall 30 by welds adjacent to each other on either side of the section plane.

The upper edges of the C-pillar outer and inner wall 30, 15 lie in this section plane over the shoulder 34. The rear mudguard 40 ends at the shoulder; the protruding shape of the shoulder 34 enables a flush transition between the rear mudguard 40 and a section 43 of the C-pillar outer wall above the shoulder that remains uncovered.

A flange is downwardly angled along a lateral edge of the parcel shelf at the level of the shoulder 43. This flange forms a welding zone 46, which extends horizontally in the longitudinal direction of the vehicle between the rear door opening 22 and rear window opening 45. The horizontal displacement between the welding zone 46 and welding flange 24 at the lower edge of the C-pillar inner part imparts a higher resistance to the part of the C-pillar extending over the shoulder 34 against a bending moment acting from a lateral direction, and thereby contributes to the torsional strength of the passenger compartment.

Figure 7:
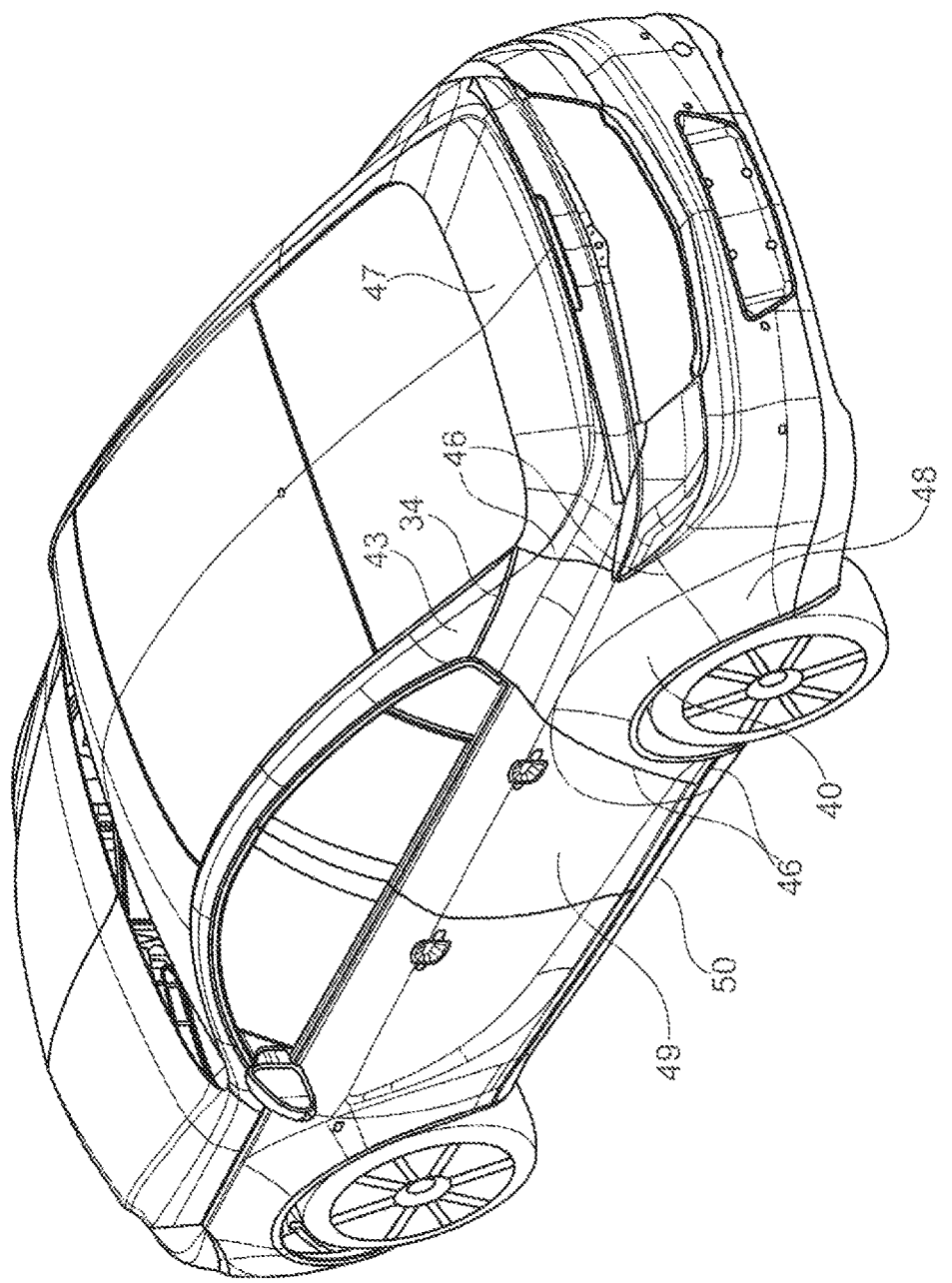
FIG. 7 is a finished vehicle.

FIG. 7 shows the finished vehicle. The rear mudguard 40 is bordered by a joint along the shoulder 34, as well as by joints 46 for a tailgate 47, a bumper skin 48, a rear door 49 and a sill 50.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
a rear wheel housing having a wheel well configured to accommodate a rear wheel and a wall section upwardly projecting from the wheel well;
a C-pillar inner wall fastened to the wall section along a first fastening zone and overlapping an opening formed in the wall section between the first fastening zone and the wheel well; and
a C-pillar outer wall joined at a weld to the C-pillar inner wall at the level of the opening.

2. The motor vehicle body according to claim 1, wherein the weld is located at a lower edge of the C-pillar inner wall.

3. The motor vehicle body according to claim 1, further comprising a rear mudguard covering the C-pillar outer wall at the level of the weld.

4. The motor vehicle body according to claim 1, wherein the wall section exhibits several openings distributed along a lower edge of the C-pillar inner wall.

5. The motor vehicle body according to claim 1, further comprising a second fastening zone provided at the rear wheel housing between the opening and the wheel well, wherein the C-pillar outer wall is fastened to the second fastening zone.

6. The motor vehicle body according to claim 1, further comprising a transverse structural element joining the C-pillar inner wall of a left body lateral wall and a right body lateral wall under a rear window opening.

7. The motor vehicle body according to claim 6, wherein the transverse structural element comprises a parcel shelf.

8. The motor vehicle body according to claim 6, further comprising a welding zone, wherein the transverse structural element is joined with the C-pillar inner wall and extends between a door opening and the rear window opening.

9. The motor vehicle body according to claim 6, wherein the transverse structural element is vertically offset relative to the first fastening zone.

10. The motor vehicle body according to claim 6, further comprising a support arranged inwardly from the C-pillar inner wall of the body and joining the transverse structural element with the rear wheel housing.

* * * * *